UNITED ~~STATES PATENT OFFI~~CE.

GEORGE KELLY, OF CHICAGO, ILLINOIS.

FIRE-PROOF MATERIAL FOR FILLING SAFES, DOORS, &c.

SPECIFICATION forming part of Letters Patent No. 283,789, dated August 28, 1883.

Application filed January 31, 1883. (No specimens.)

*To all whom it may concern:*

Be it known that I, GEORGE KELLY, a citizen of the United States, and a resident of Chicago, in the county of Cook and State of Illinois, have invented a new and useful Fire-Proof Material for Filling Safes, Doors, Shutters, &c., of which the following is a specification.

My invention relates to improvements in that class of materials which are used as fire-proof fillings or linings for safes, &c., so as to prevent access of heat through the walls of such articles; and my improvement has for its object to furnish a cheap and easily applied filling possessing to a marked degree non-conducting properties.

To enable those skilled in the art to which my invention appertains to make use of and apply my improved material, I will now more fully describe the same and its method of application.

To form my improved non-conducting filling I make use of silicate of soda or potassa, or what is commonly known as "soluble glass." I prefer to use such material in a semi-liquid state, in which condition it remains in the cavity of the safe-wall, &c., to which it is applied until such article is exposed to an excessive heat, when such material desiccates and swells up into a spongy or cellular mass, which possesses to an extraordinary degree non-conducting and heat-resisting properties. For some special purposes the semi-fluid mass of soluble glass may be desiccated into such solid, spongy or cellular mass and be used in the form of cakes, slabs, or in a crushed condition, as desired or found most convenient.

I am aware that prior to my invention silicate of soda has been employed as a cementing material for non-conducting substances in fire-proof fillings for safes, &c. I therefore do not claim such mode of application; but What I do claim, and desire to secure by Letters Patent, is—

1. A lining for fire-proof safes and other articles, composed solely of soluble glass, as described, and for the purpose set forth.

2. A lining for fire-proof safes and other articles, composed solely of soluble glass in a semi-fluid state, as described, and for the purpose set forth.

3. As an improved article of manufacture, a lining for fire-proof safes and other articles, composed solely of soluble glass desiccated into a spongy or cellular mass.

In testimony whereof, witness my hand this 27th day of January, 1883.

GEORGE KELLY.

In presence of—
  ROBERT BURNS,
  J. THOMPSON.